United States Patent
Badeaux et al.

(10) Patent No.: US 11,712,029 B1
(45) Date of Patent: Aug. 1, 2023

(54) CRAWFISH HARVEST SYSTEM

(71) Applicant: Crawline LLC, Gueydan, LA (US)

(72) Inventors: Jason Badeaux, Gueydan, LA (US);
Bryant Faulk, Gueydan, LA (US);
Justin Bertrand, Gueydan, LA (US);
Randy Smith, Estherwood, LA (US)

(73) Assignee: CRAWLINE LLC, Gueydan, LA (US)

( * ) Notice: Subject to any disclaimer, the term of this patent is extended or adjusted under 35 U.S.C. 154(b) by 109 days.

(21) Appl. No.: 17/147,525

(22) Filed: Jan. 13, 2021

Related U.S. Application Data (60) Provisional application No. 62/960,211, filed on Jan. 13, 2020.

(51) Int. Cl.
*A01K 80/00* (2006.01)
*A01K 61/59* (2017.01)
*A01K 69/06* (2006.01)
*A01K 69/08* (2006.01)

(52) U.S. Cl.
CPC .............. *A01K 80/00* (2013.01); *A01K 61/59* (2017.01); *A01K 69/06* (2013.01); *A01K 69/08* (2013.01)

(58) Field of Classification Search
CPC ........ A01K 61/59; A01K 69/06; A01K 69/08; A01K 80/00
USPC ........................................................ 43/102
See application file for complete search history.

(56) References Cited

U.S. PATENT DOCUMENTS

| | | | | |
|---|---|---|---|---|
| 1,903,627 | A * | 4/1933 | Koch | E02B 8/085 43/102 |
| 2,071,670 | A * | 2/1937 | Warner | E02B 8/085 210/154 |
| 2,648,918 | A * | 8/1953 | Mazzella | A01K 80/00 37/316 |
| 2,787,861 | A * | 4/1957 | Hansen | A01K 69/06 43/102 |
| 2,901,859 | A * | 9/1959 | Hansen | A01K 69/06 43/105 |
| 3,426,472 | A * | 2/1969 | Richard | A01K 69/08 43/100 |
| 3,608,217 | A * | 9/1971 | Voisin | A01K 80/00 37/316 |
| 3,672,091 | A * | 6/1972 | Cloutier | A01K 91/18 43/27.2 |
| 3,722,126 | A * | 3/1973 | Whipple | A01K 73/06 43/6.5 |
| 3,908,291 | A * | 9/1975 | Masuda | E21C 50/00 226/186 |
| 4,736,541 | A * | 4/1988 | Serba | A01K 73/06 43/27.2 |

(Continued)

*Primary Examiner* — Christopher D Hutchens
(74) *Attorney, Agent, or Firm* — Law Office of Jesse D. Lambert, LLC (57) ABSTRACT

A crawfish harvest system and method of harvesting crawfish from a crawfish pond, without entry into the pond by personnel or boats. A crawfish trap deployment and retrieval unit is positioned by a crawfish pond. One or more crawfish traps are attached to a main line, which is engaged with the deployment and retrieval unit and runs into the crawfish pond and around one or more turn points in the pond, forming an endless loop of main line. The crawfish traps can be deployed into and retrieved from the crawfish pond by the deployment and retrieval unit pulling the main line, without personnel, boat or other entry into the pond.

15 Claims, 12 Drawing Sheets

(56) References Cited

U.S. PATENT DOCUMENTS

| | | | | |
|---|---|---|---|---|
| 4,887,382 A | * | 12/1989 | Moritz | A01K 69/06 43/102 |
| 5,165,174 A | * | 11/1992 | Brown, Jr. | A01K 69/06 254/371 |
| 5,187,893 A | * | 2/1993 | Knight | A01K 69/06 43/103 |
| 2008/0295365 A1 | * | 12/2008 | Boudreau | E02F 3/9243 37/316 |
| 2010/0071630 A1 | * | 3/2010 | Borne, III | A01K 61/59 119/213 |

* cited by examiner

Leading End

FIG. 4

Trailing End

Top View
FIG. 7

CRAWFISH HARVEST SYSTEM

CROSS REFERENCE TO RELATED APPLICATIONS

This non-provisional patent application claims priority to U.S. provisional patent application Ser. 62/960,211, filed Jan. 13, 2020, for all purposes. The disclosure of that provisional patent application is incorporated herein by reference, to the extent not inconsistent with this disclosure.

BACKGROUND—FIELD OF THE INVENTION

This invention relates to apparatus and method used in connection with the harvesting of crayfish, commonly known in many areas as "crawfish" and referred to as such herein, from shallow ponds, commonly referred to as "crawfish ponds" or at times herein simply as "ponds." Many such ponds are created in fields used for the production of rice, in South Louisiana and other areas. The fields are flooded for rice cultivation, then while still flooded crawfish are grown in the ponds.

Commercial harvesting of crawfish in pond settings has traditionally been done via so-called "pyramid" traps, which are placed out in the pond at desired spacings. The traps rest on the bottom of the pond and are baited to attract the crawfish to enter the trap through funnels; once inside, the crawfish generally remain inside. The traps must be periodically (usually daily) checked, the crawfish inside emptied out, the trap re-baited and placed back in the pond, etc.

The most common manner in which the crawfish traps are placed into the pond and checked is by way of a "crawfish boat." Such boats vary in design, but most of them use a large powered wheel extending from the front or back (or both) of the boat, that digs into the soft bottom of the pond and pulls or pushes the boat along. The boat proceeds along a line of traps, each trap is picked up by the boat operator or a helper; the trap emptied of crawfish, rebaited, and placed back into the pond, and the process repeated along the line.

This traditional manner of placing, running, and retrieval of crawfish traps presents a number of disadvantages:

Personnel and equipment must enter the pond and proceed to each and every trap to check it, at least once per day;

At least one, and sometimes two, workers are required for a time to run the traps;

Crawfish boats require significant upfront purchase costs and continued maintenance;

Pulling the traps onto a boat, emptying them, re-baiting, etc. is in general a hard and dirty task.

Yet another very significant issue is the damage which wheeled crawfish boats do to the very soft bottoms in the ponds. The crawfish boat wheels cut multiple deep ruts in the pond bottom, which come into view when the ponds are drained in preparation for rice cultivation. The ruts must be smoothed out and the pond (now field) must be repaired, in order for rice cultivation/harvesting equipment to move around in the pond/field. The costs to repair fields are significant, and may be on the order of $40 to $50 per acre.

In response to this field damage issue, some rice farmers require the use of air boats, which do not create the large ruts; or harvest by a worker wading in the pond and pushing/pulling a small boat. Still others simply refuse to allow crawfish farming in their rice field ponds, thereby causing all parties to lose out on a potentially significant revenue source.

All of these issues give rise to the need for a crawfish harvesting system which minimizes entry into the pond by personnel or mechanized equipment, including boats, yet still yields a sufficient harvest. The known harvest systems and methods all present various issues, giving rise to a desire for an improved crawfish harvesting system (including apparatus and methods) that addresses these issues.

SUMMARY OF THE INVENTION

The crawfish harvest system embodying the principles of the present invention comprises a plurality of crawfish traps which are connected to an "endless" main line (essentially, a large loop of line) by a hanger system, and a crawfish deployment and retrieval unit which, by means of pulling in the main line, retrieves the crawfish traps from the pond, then deploys them back out into the pond, with minimal worker entry into the pond. The main line runs from a starting location or staging post positioned typically out of the pond, on a surrounding shore or levee, out into the pond, around one or more "turn points" in the pond, which may be post-mounted pulleys in the pond, and back to the starting location. The two ends of the main line may have loops thereon and may be joined by a bridle (which is another relatively short length of line), thereby creating an endless loop of line. The crawfish trap deployment and retrieval unit comprises a pulley/roller system and a hydraulic motor/control system (which may be separate from the pulley/roller system) which pulls the main line around the turn points, thereby pulling in the crawfish traps attached to the main line. As the crawfish traps, connected to and being carried along by the main line, approach the crawfish trap deployment and retrieval unit, they are raised from the water by virtue of the main line being elevated by its engagement with the pulley/roller system. As the crawfish traps (hanging from the main line) approach the crawfish trap deployment and retrieval unit, the traps hang vertically, with the trapped crawfish thereby falling to the bottom end (which is the rear or trailing end) of the crawfish trap. The crawfish traps are on a hanger assembly which runs through the pulley/roller system, along with the main line; while the crawfish trap moves through the pulley/roller system, the operator can open a door on the lowermost (trailing) end of the trap and dump the crawfish into a sorter/bagger. Bait can be replaced in the trap and the door of the trap closed. The crawfish trap then proceeds back into the pond, conveyed by the main line, as the main line is pulled by the pulley/roller system. The crawfish trap and hanger assembly are designed such that the crawfish trap approaches entry back into the pond in proper alignment to gradually assume a proper position on the bottom of the pond, with the bottom of the trap on the bottom of the pond, and the trap is pulled/dragged along to its ultimate location in the pond, when pulling of the main line stops. Preferably, pulling of the main line stops when the two ends of the main line return to the starting point, at which point the two ends of the main line can be secured, the bridle detached, and if desired the crawfish trap deployment and retrieval unit can move to another location where another main line is set, and the process repeated.

DESCRIPTION OF THE PRESENTLY PREFERRED EMBODIMENT(S)

While various crawfish harvesting systems can embody the principles of the present invention, with reference to the drawings some of the presently preferred embodiments can be described.

Overall Crawfish Harvesting System

The crawfish harvesting system embodying the principles of the present invention comprises several elements. In summary, a crawfish trap deployment and retrieval unit, referred to as times as the "unit" (via a pulley/roller system powered by a hydraulic motor and control system, the hydraulic motor in turn powered by a hydraulic pump driven by (for example) an internal combustion engine) pulls in a main line, which forms an endless loop running from the unit out into the crawfish pond around one or more turn points positioned in the crawfish pond. One or more crawfish traps are attached to the main line, at desired spaced-apart intervals, and are pulled into the unit (retrieved) one by one where the trapped crawfish are dumped out, and the crawfish trap re-baited. The continued pulling in of the main line then pulls the crawfish traps back out into the crawfish pond (deployed), as other crawfish traps are being retrieved. The design of the crawfish trap and the hanger assembly which connects it to the main line ensures that the crawfish trap remains in its proper orientation throughout the deployment and retrieval cycle; namely, the crawfish trap moves from a vertical position hanging from the main line when the trapped crawfish are emptied out, gradually moving back into the pond to contact the bottom of the pond and rotate to assume a position on the bottom of the pond, where the trap is then pulled along to its ultimate location. The hanger assembly ensures that the crawfish trap remains positioned with its bottom surface at substantially right angles to the axis of the main line, so that the crawfish trap comes into proper position with its bottom surface on the bottom of the pond.

It can be readily understood that a number of crawfish traps may be deployed and retrieved in a crawfish pond, with minimal entry into the pond by personnel or equipment.

Figure 1:
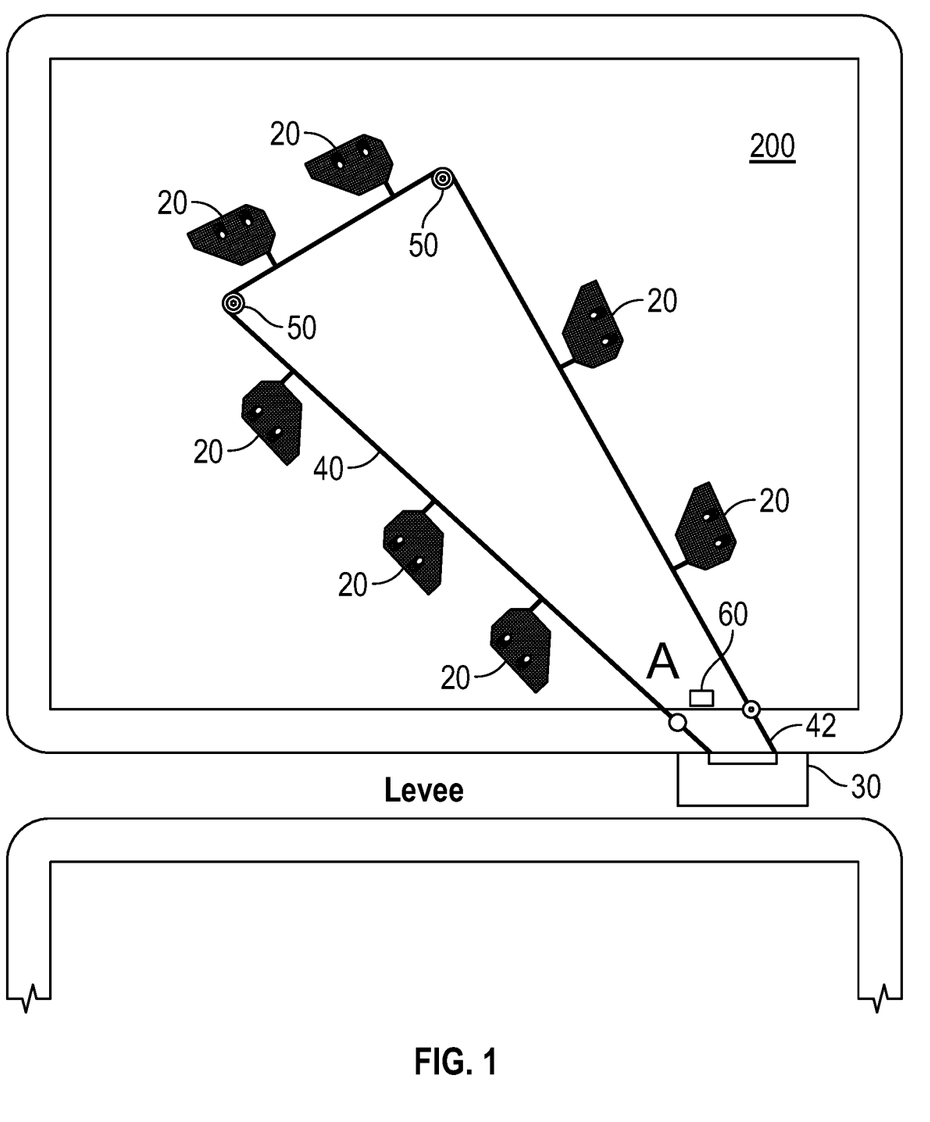
FIG. 1 is a top or bird's eye view of an exemplary installation of the crawfish harvest system embodying the principles of the present invention.

FIG. 1 is a top or bird's eye view of a typical crawfish harvest system installation. A crawfish pond 200 is typically a shallow pond, with water approximately (by way of example) 12" to 18" deep, defined by a levee which surrounds the pond and retains the water within the pond.

Figure 9:
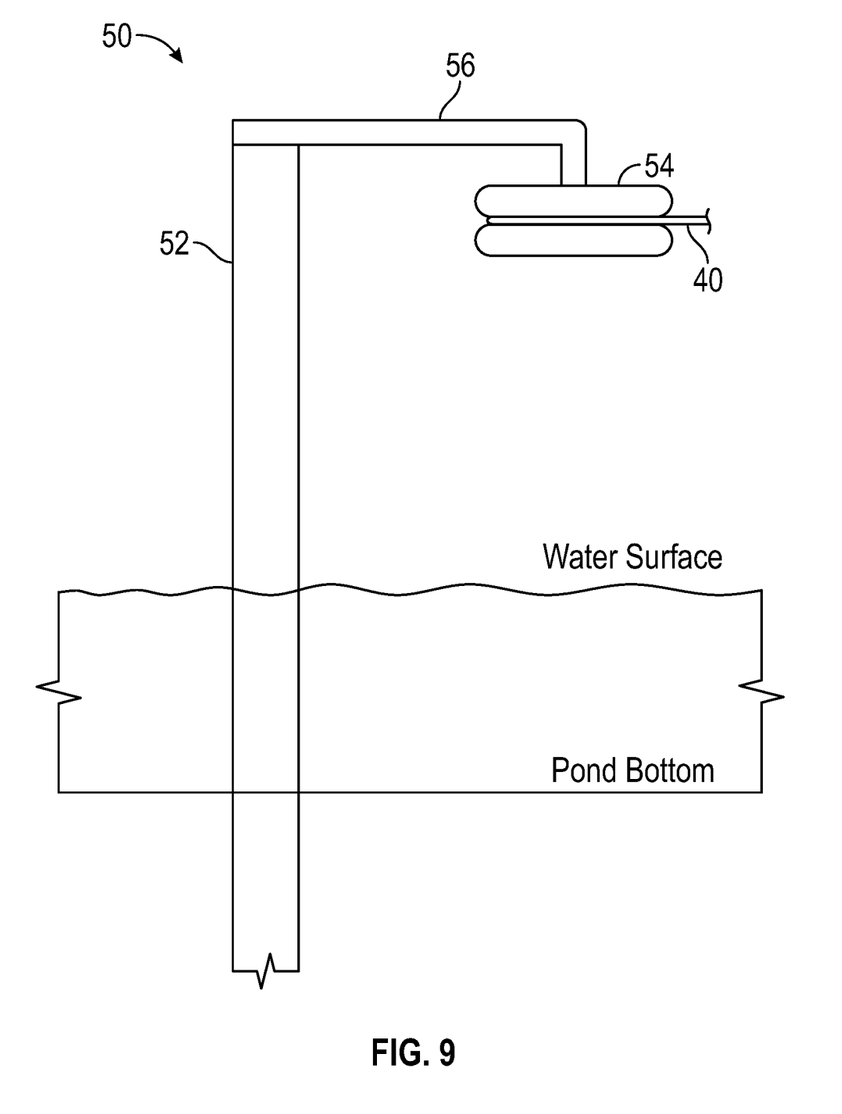
FIGS. 9 and 10 are side and perspective views of a field turn point mechanism.
Figure 10:
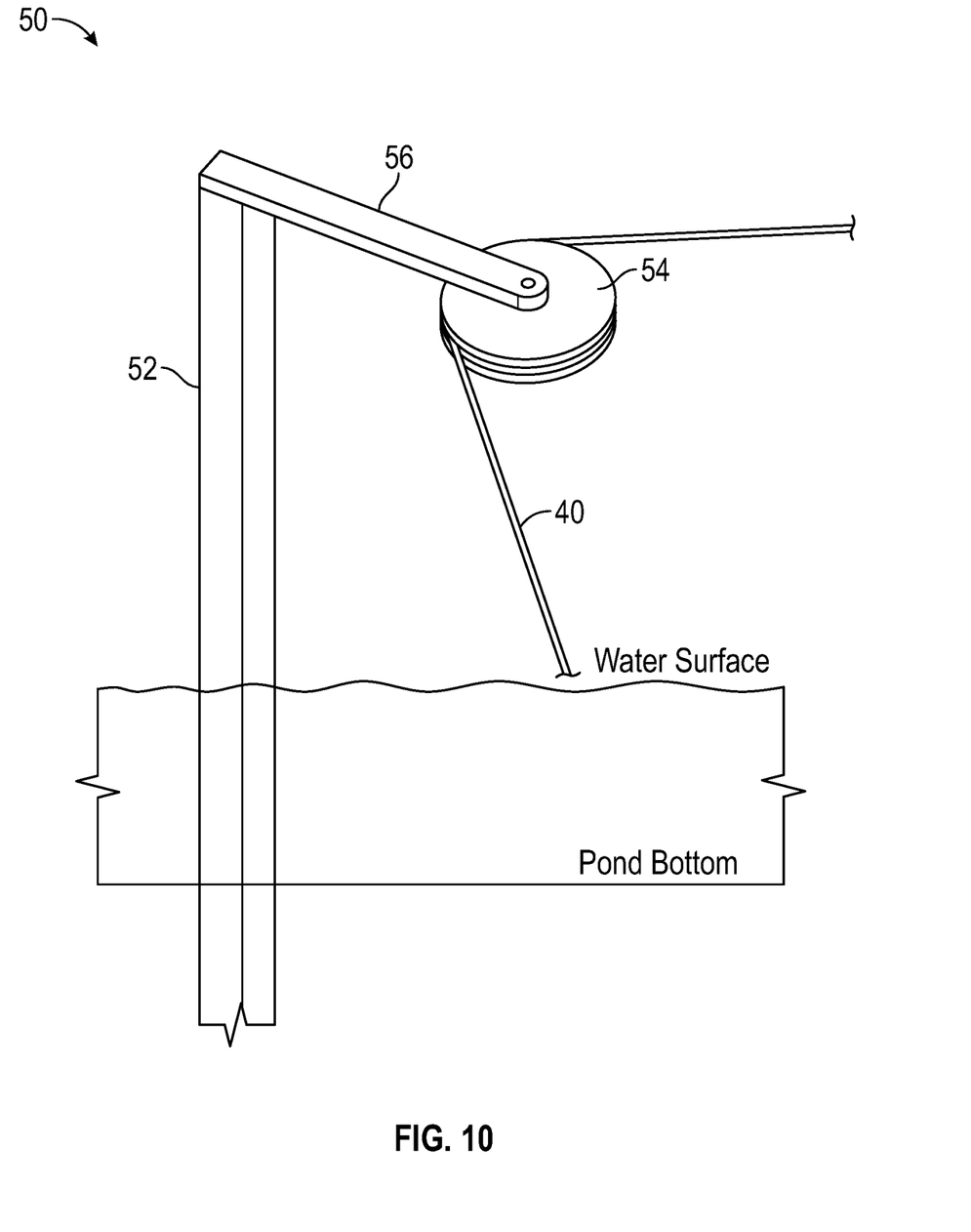

Turn points 50 are fixed in crawfish pond 200 at desired locations. The number of turn points 50 may take any number, from one to two, three, or four or more. FIGS. 9 and 10 show side and perspective views of one embodiment of turn point 50, which is a stake or pole 52 typically driven into the bottom of the crawfish pond, with a pulley 54 mounted on a swiveling arm 56. As will be described later, main line 40 runs around the pulley(s) of turn points 50.

Figure 11:
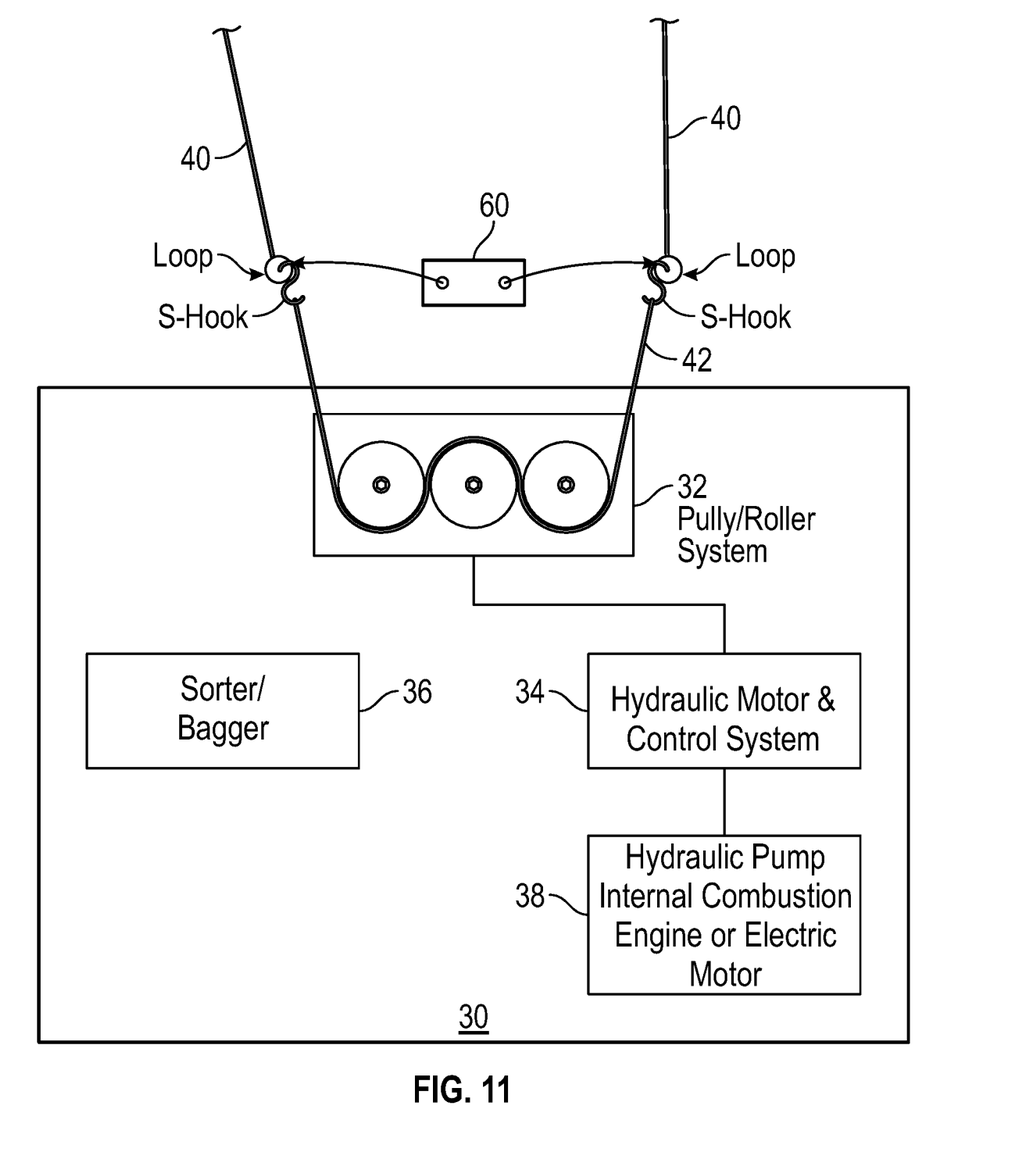
FIG. 11 is a top view of various components of the crawfish trap deployment and retrieval unit (with any protective covering removed in order to show the various components), including the pulley system, the hydraulic motors/controls (in schematic form), and the sorting/bagging table (in schematic form), also showing some details of the main line ends, main line staging post, and the bridle.

A main line 40 runs from a first or starting position, which may be at or near a main line staging post 60, around turn points 50, and back to the first position. While various embodiments can be used, main line 40 may have two ends with loops that are held on prongs on the main line staging post 60, when the crawfish traps are not being retrieved and deployed. FIG. 11 shows more detail.

One or more crawfish traps 20 are connected to main line 40, preferably by a hanger assembly 100 which permits main line 40 to rotate as it is pulled by crawfish deployment and retrieval unit 30, while pulling crawfish traps 20 through their deployment/retrieval cycle, keeping crawfish traps 20 in their proper orientation for each stage in the deployment/retrieval cycle (described in more detail below). It is understood that hanger assembly 100 can run around pulleys 54 of turn points 50, and around and through the pulley system 32 in the crawfish trap deployment and retrieval unit 30. It is further understood that the position of crawfish traps 20 in FIG. 1, relative to main line 40, is to show the spacing of crawfish traps 20 along main line 40; in fact, when crawfish traps 20 are actually deployed, their bottom surfaces are substantially parallel to the bottom of pond 200, whereas in FIG. 1 the bottom surfaces of crawfish traps 20 are shown substantially at right angles to the bottom of pond 200.

The Crawfish Trap and Hanger Assembly

Figure 2:
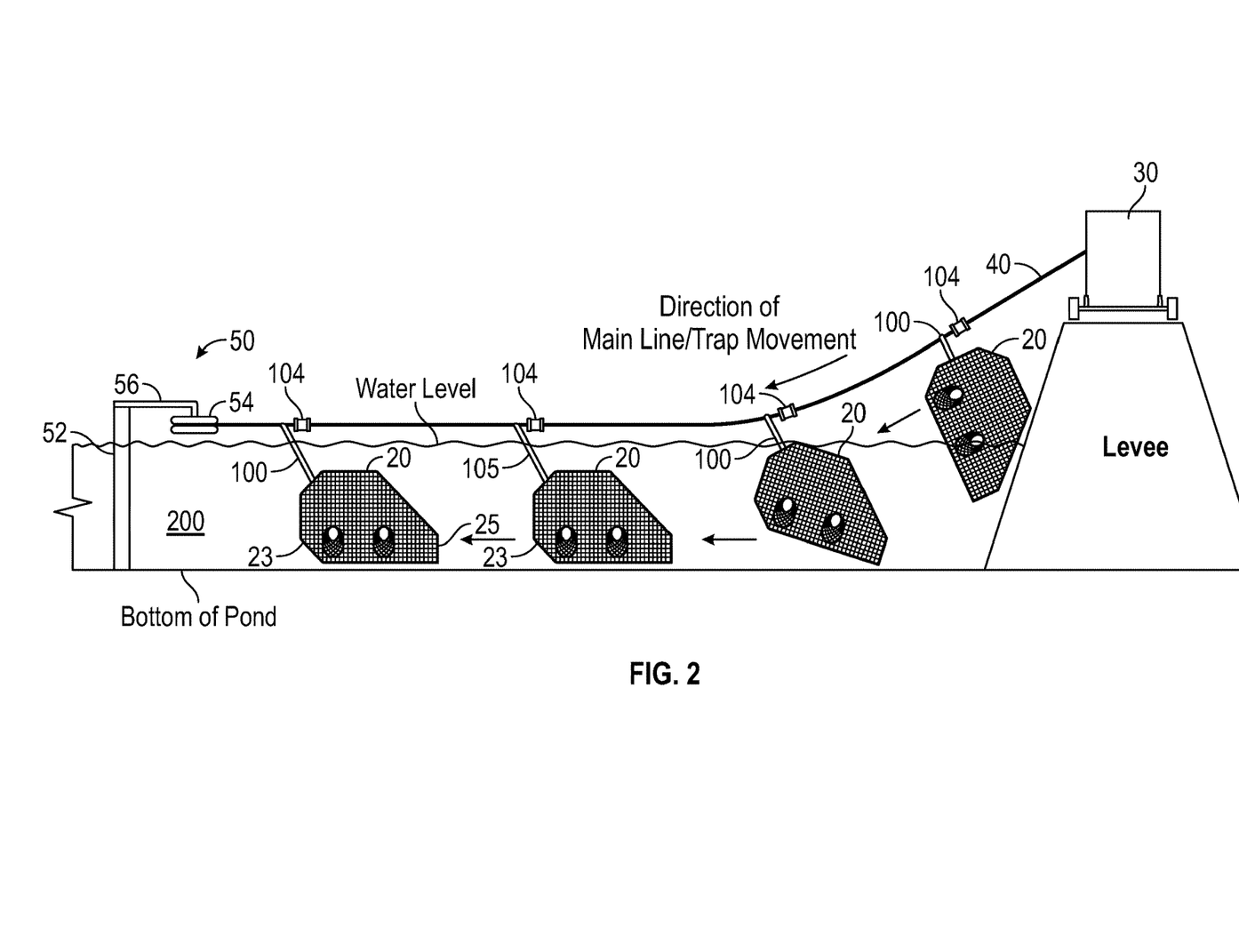
FIG. 2 is a side/perspective view of an exemplary installation of the crawfish harvest system embodying the principles of the present invention, showing the crawfish trap deployment and retrieval unit, the main line, and a number of crawfish traps being retrieved and deployed.
Figure 3:
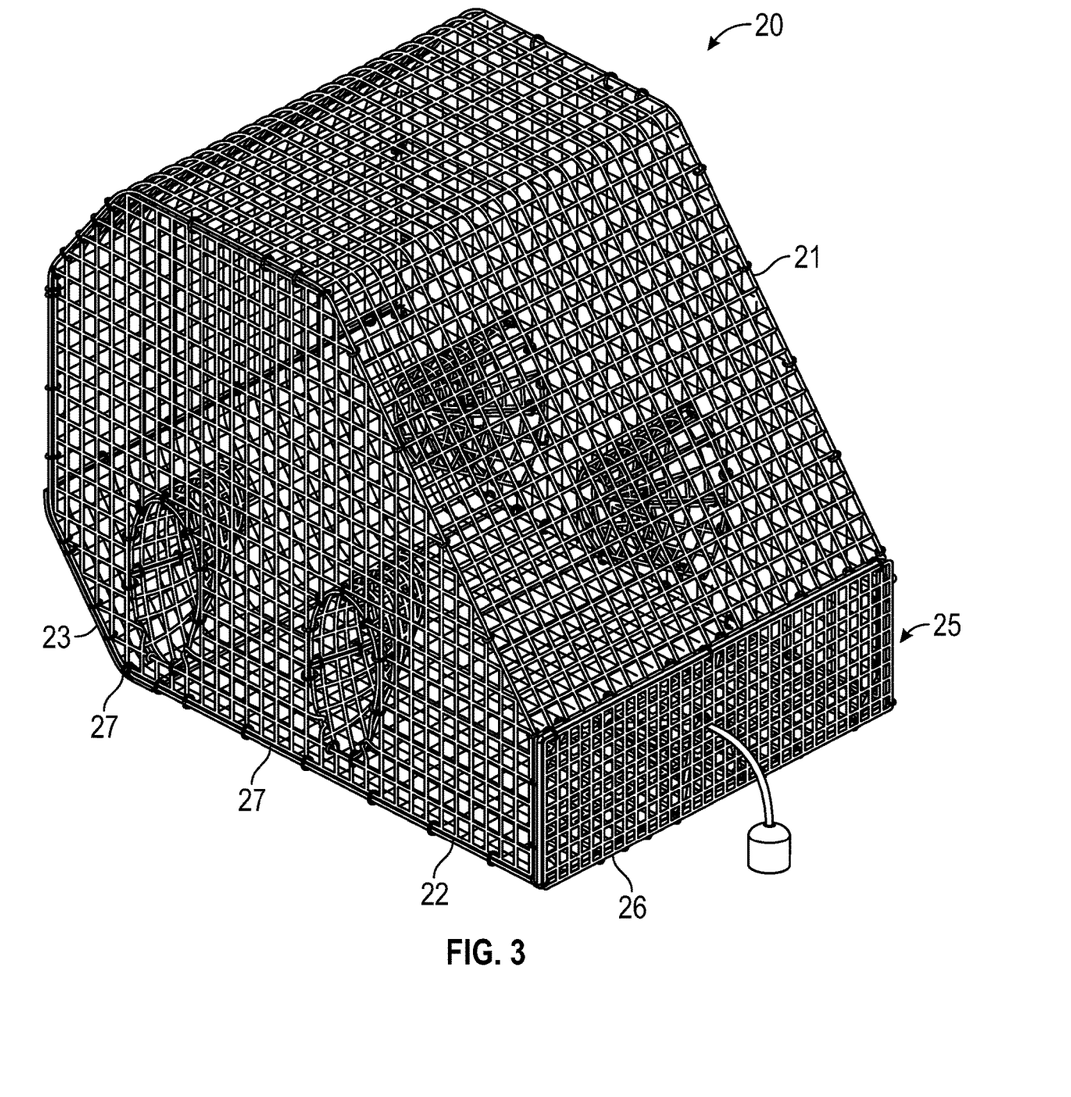
FIGS. 3-7 are perspective, front (leading end), rear (trailing end), side, and top views of an exemplary crawfish trap suitable for use in the crawfish harvesting system.
Figure 4:
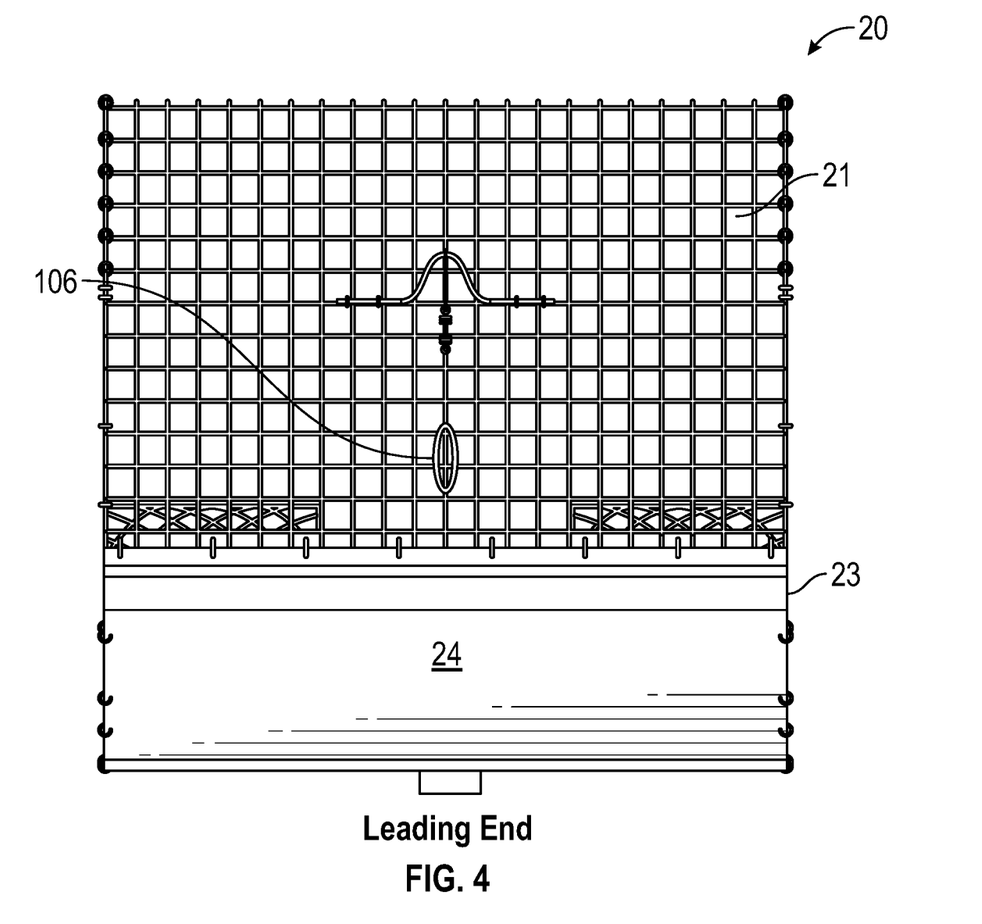
Figure 5:
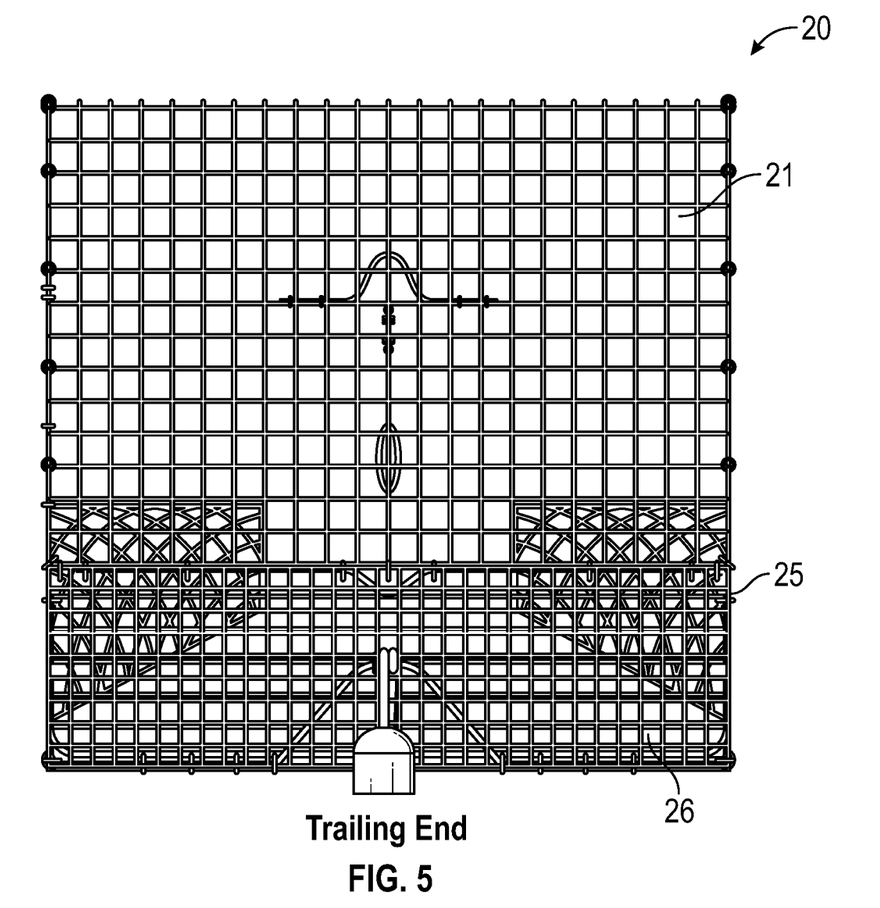
Figure 6:
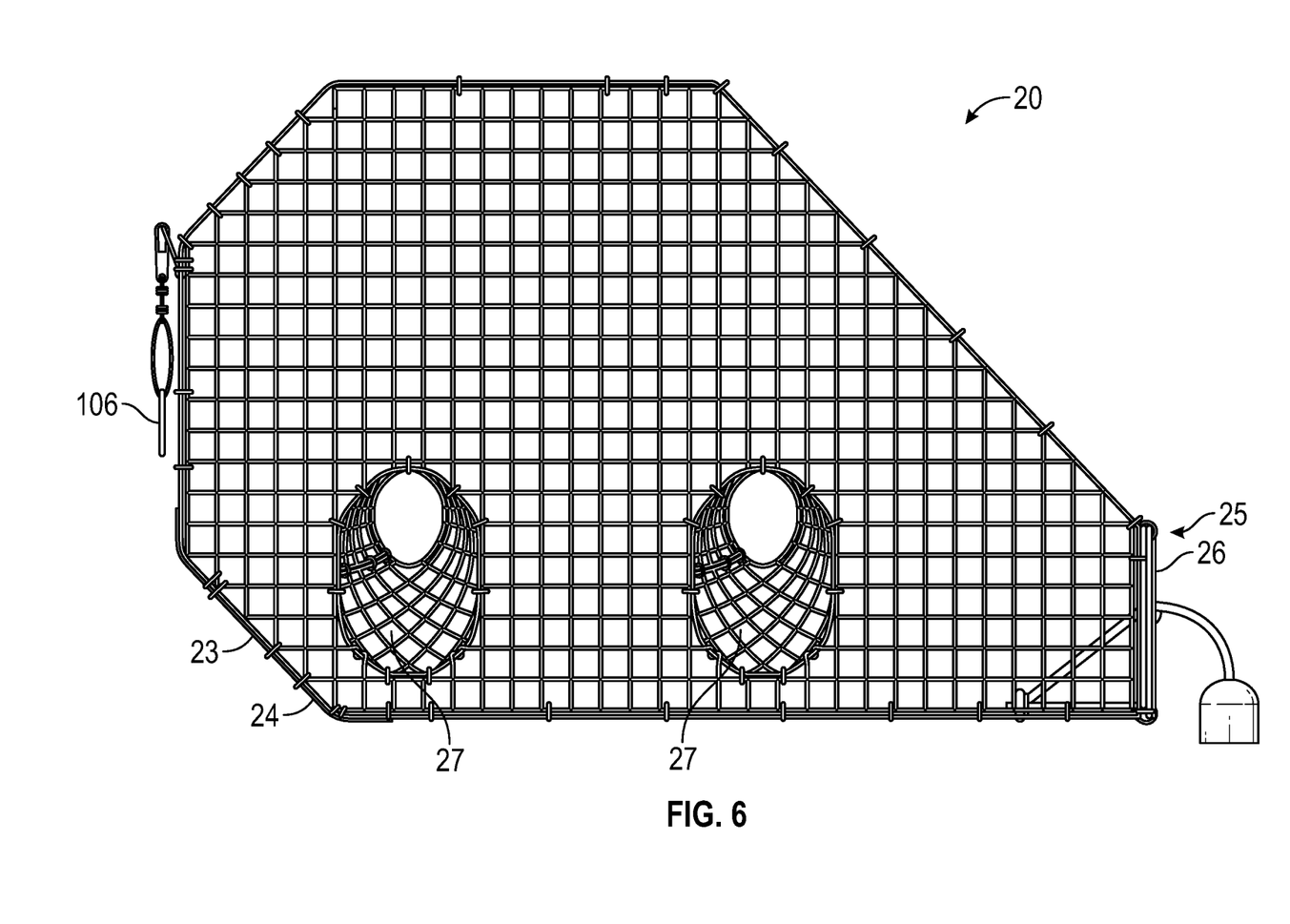
Figure 7:
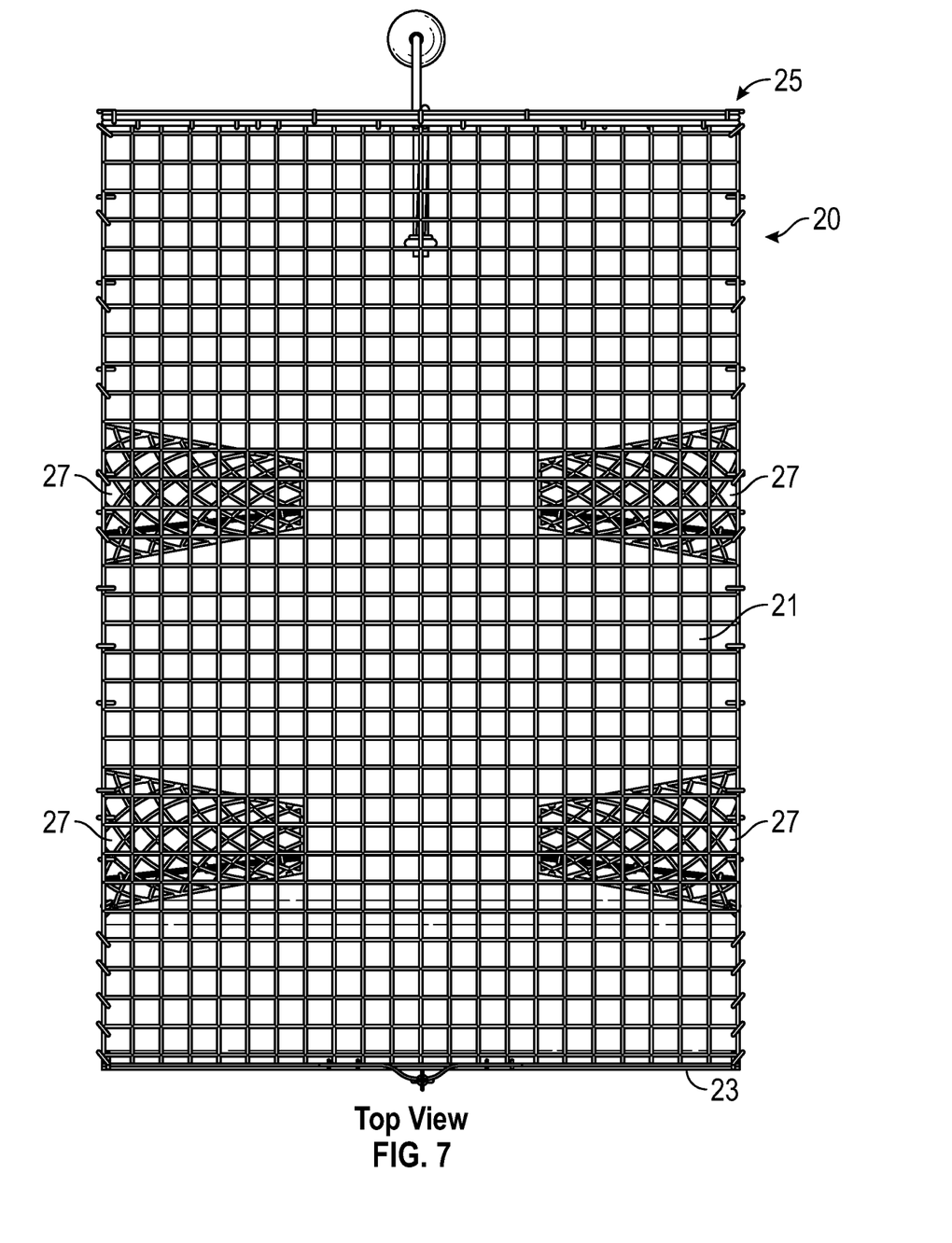

FIGS. 3-7 are perspective, front (leading end), rear (trailing end), side, and top views of an exemplary crawfish trap suitable for use in the crawfish harvesting system. Crawfish trap 20 comprises a cage typically formed from a mesh material, for example coated wire mesh. A main body 21 forming a cage enclosure is sized to accommodate a desired volume of caught crawfish, permit easy handling, etc. Generally, in a top view (or a bottom view, not shown), as in FIG. 7, crawfish trap 20 may have a generally rectangular shape, yielding a flat bottom 22 sufficiently wide to permit trap 20 to be stable in position on the bottom (labelled) of crawfish pond 200. FIG. 6 is a side view of crawfish trap 20, which shows the upturned front or leading end 23. Preferably, leading end 23 comprises a sheet-like material 24, as can be seen in FIG. 4, for example plastic sheeting, which yields a smooth leading face to ease pulling crawfish trap 20 along the bottom of crawfish pond 200. The typical direction of movement of crawfish trap 20, as it moves through its retrieval and deployment, is shown by the annotated arrows in various of the figures, esp. FIG. 2.

Preferably, the trailing end 25 of crawfish trap 20 tapers down (when viewed from a side) to a hinge mounted door 26, preferably with a spring loaded "snap action" opening and closing mechanism. The tapering shape tends to funnel the crawfish down to a relatively small opening. One or more funnels 27 are positioned in main body 21, typically two funnels on each side, to permit crawfish to enter the trap. The trap may be baited with any crawfish bait known in the industry. As is known in the industry, the crawfish enter the crawfish trap through the funnels, and generally cannot get back out of the trap.

Figure 8:
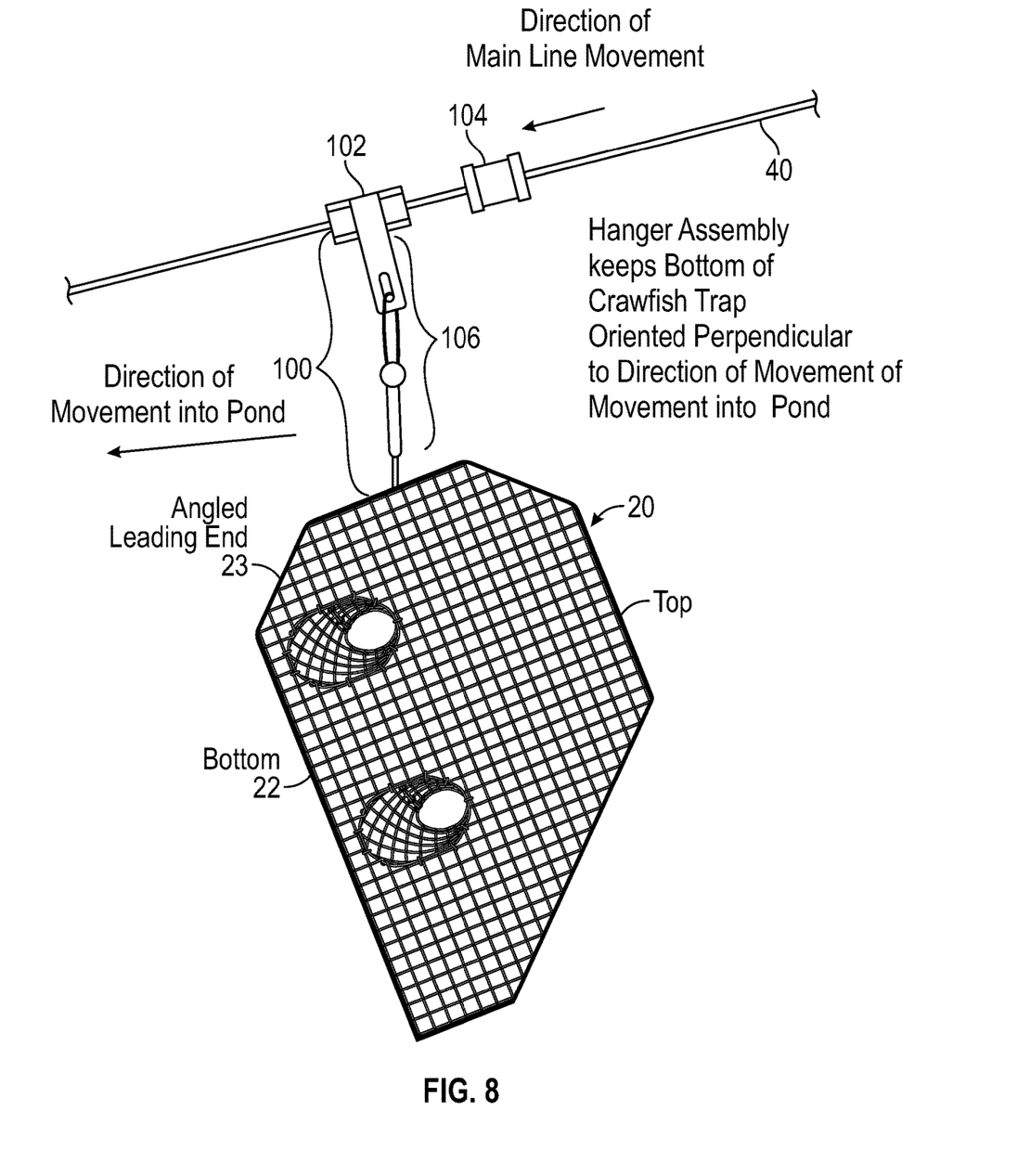
FIG. 8 is a view of an exemplary embodiment of the crawfish trap hanger assembly, shown suspending a crawfish trap from a main line.

Crawfish trap 20 is connected to main line 40 by a hanger assembly 100, which permits relative movement of the main line (e.g., twisting of the main line as a result of being pulled around the turn points, etc.) relative to hanger assembly 100, while still providing the positive pull on the crawfish trap needed to deploy and retrieve it; and also to properly align the crawfish trap throughout its passage into and out of the crawfish pond, and passage through the crawfish trap deployment and retrieval unit 30 for dumping of the crawfish, re-baiting, etc. In one embodiment, hanger assembly 100 comprises a thimble or collar 102 through which main line 40 passes. It is understood that collar 102 can freely rotate around and slide on main line 40. Stops 104 are placed on main line 40 at desired locations to permit some amount of sliding of collar 102 on main line 40, but to provide a positive limit on relative movement between collar 102 (and therefore bridle 106 and crawfish trap 20) and main line 40. Hanger extension 106 connects crawfish trap 20 to collar 102, and is shaped and configured so as to maintain the alignment of crawfish trap 20 relative to the axis of main line 40; namely, with the width and bottom surface 22 of crawfish trap 20 remains substantially perpendicular to the longitudinal axis of main line 40, as crawfish trap 20 moves from the crawfish trap deployment and retrieval unit 30 back into crawfish pond 200. Referring also to FIG. 2, in this manner, as crawfish trap 20 is deployed back into crawfish pond 200 after it (crawfish trap 40) leaves crawfish trap deployment and retrieval unit 30, the trap moves from a position hanging substantially vertically, to being eased into crawfish pond 200 in proper alignment for crawfish trap 20 to contact the bottom of crawfish pond 200 with its bottom surface 22 and rotate into position flat on the bottom of the pond, where it can then be dragged along by main line 40 (with a stop 104 contacting a collar 102, therefore pulling hanger assembly 100 and the attached crawfish trap 20) to its ultimate resting position in the pond. As is known in the industry, crawfish traps 20 remain in the crawfish pond 200 for a desired length of time, sufficient for crawfish to move into the traps in search of the bait inside.

Crawfish Trap Deployment and Retrieval Unit

Referring to FIG. 11, crawfish trap deployment and retrieval unit 30 comprises a powered pulley/roller system 32 which pulls in main line 40 (as it moves in an endless loop around turn points 50 in crawfish pond 200), picking up crawfish traps 20 out of crawfish pond 200 to gradually assume a vertical position; and moves crawfish trap 20 through pulley/roller system 32 slowly enough, or stopping the unit as required, for the operator to open door 26 and let the crawfish fall out into a sorter/bagger 36 (represented schematically in FIG. 11). In one embodiment, in a starting position, a bridle 42 (namely, a relatively short section of substantially the same material as main line 40, perhaps 10 to 15 feet) runs through pulley/roller system 32, with the ends of bridle 32 having open S-hooks thereon. Preferably, crawfish trap deployment and retrieval unit 30 (which may be referred to as "unit" at times herein) is mounted on a wheeled carriage or skid equipped carriage, to enable moving it to a desired location, typically on a crawfish pond levee. Unit 30 is brought near a main line staging post 60, on which the looped ends of main line 40 are positioned. Bridle 42 is connected to the ends of main line 40 by the S-hooks or similar means, thereby forming an "endless loop" of bridle/main line material. In a preferred embodiment, pulley/roller system 32 is mounted on a plate which can be inclined or tipped downward to enable the bridle/main line connection, then the plate rotated back to a substantially horizontal position. The pulley/roller system 32, powered by one or more hydraulic motors and associated controls (represented schematically as 34 in FIG. 11), and which may also comprise an internal combustion engine or electric motor to power a hydraulic pump which supplies the hydraulic motors, shown schematically as element 38, commences rotation, pulling in main line 40. Preferably, a foot-operated control permits the operator to start and stop pulley/roller system 32, and to control its speed. Once all crawfish traps have been retrieved from the pond, emptied of crawfish, and returned to the pond, bridle 42 has made its way back into position within pulley/roller system 32, and the end loops on main line 40 can be placed back on the staging post 60 and the bridle disconnected. The unit 30 may then be moved if necessary to another staging post from which another main line assembly runs, and the process repeated. In another embodiment, internal combustion engine or electric motor and hydraulic pump element 38 is carried on a wheeled carriage or the like, and is moved to multiple retrieval and deployment units 30 as desired, with the remaining components remaining in place.

FIG. 11 also shows in schematic form the sorter/bagger 36 of unit 30. Sorter/bagger 36 may take a number of forms, but in a presently preferred embodiment comprises an adjustable grate which permits undersize crawfish to fall through and be returned to the pond. Larger crawfish are moved into bags for further handling and sale. It is understood that sorter/bagger 36 may comprise various other elements for handling of the crawfish, as desired.

Figure 12:
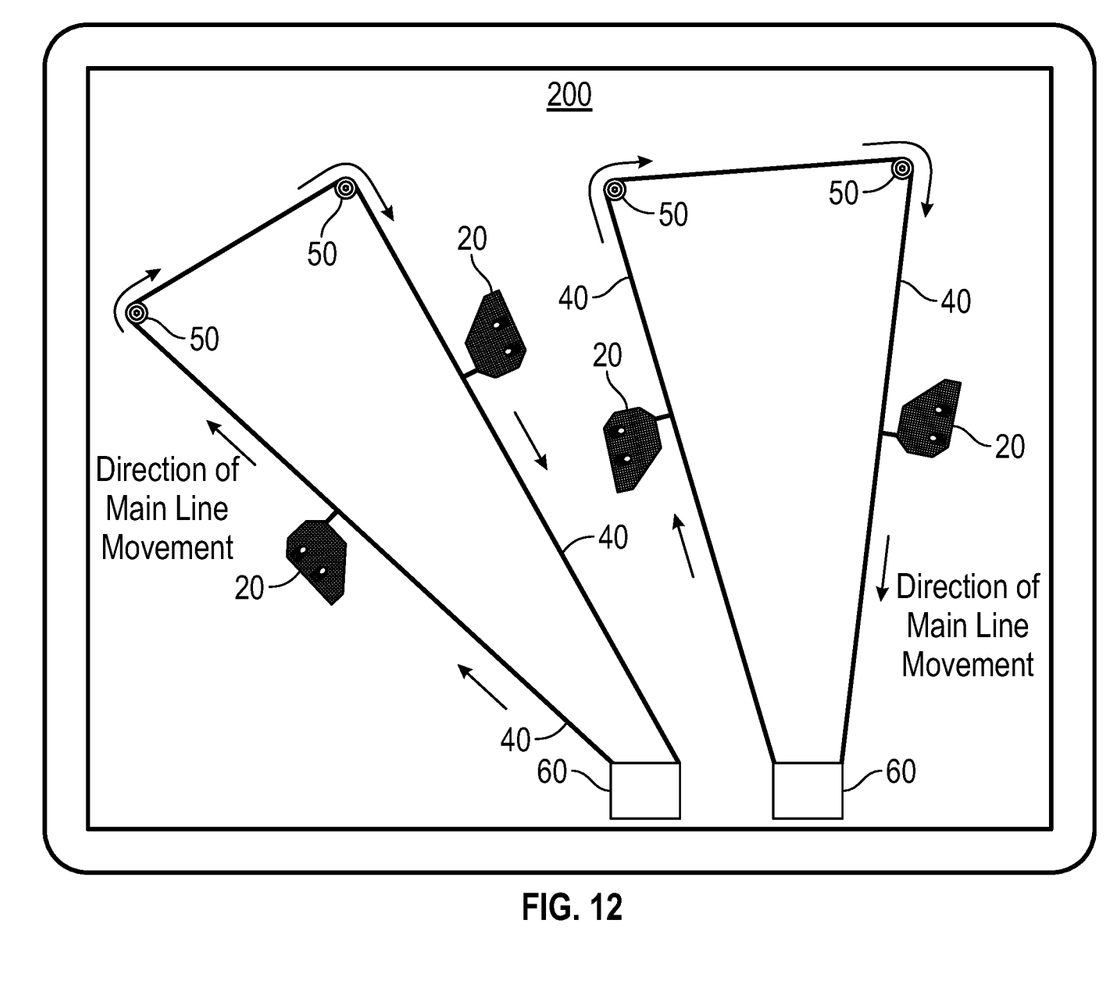
FIG. 12 is a top or bird's eye view of alternate embodiments of the main line settings in a crawfish pond, with two main lines being shown.

It is understood that any number of crawfish traps 20 may be on a given main line 40, from one to many. Any number of turn points 50 may be in crawfish pond 200, depending on its size and the area desired to be fished. Only a single turn point 50 could be present, with crawfish traps 20 simply pulled out in more a less a straight line, and either around turn point 50 and back or simply to the turn point and straight back to the Unit 30 (by reversing the direction of main line 40 pull). Several main line staging posts 60 could be mounted in very close proximity, so that several main line circuits could be run from effectively one placement of unit 30 (see FIG. 12 showing several "loops" of multiple main lines 40, with attached crawfish traps 20, into crawfish pond 60 from substantially the same staging area 60). As in FIG. 1, in FIG. 12 crawfish traps 20 are shown rotated from their actual position in the pond, in order to better show their position along main line 40.

Materials, Fabrication

The materials used in fabricating the various elements of the crawfish harvest system are generally well known in the art, including both metals and non-metals. As noted above, crawfish traps 20 are generally (by way of example) made of a coated wire mesh. Main line 40 may be of heavy monofilament line; or alternatively may be braided line or small diameter steel cable. Methods of fabrication of the components of the crawfish harvest system are known in the relevant art.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example, various types of crawfish traps may be used in the system; the crawfish trap retrieval and deployment unit may take various forms; any number of main line loops may be serviced from a single main line staging point, etc.

Therefore, the scope of the invention is to be determined not by the illustrative examples set forth above, but by the appended claims and their legal equivalents.

We claim:
1. A crawfish harvest system, comprising:
a crawfish trap deployment and retrieval unit positioned proximal a crawfish pond;
one or more crawfish traps attached to a main line, the main line engaged with said crawfish trap deployment and retrieval unit and running into said crawfish pond and around one or more turn points in said crawfish pond,
said one or more crawfish traps deployable into said crawfish pond and retrievable from said crawfish pond by said crawfish trap deployment and retrieval unit pulling said main line;
wherein said one or more crawfish traps comprise:
a main body of a mesh material forming a cage, said main body comprising two opposed sides, a bottom, and a leading and trailing end, said main body when viewed from a side comprising an upwardly angled leading end bottom;
one or more funnel-shaped entries into said main body, said funnel shaped entries designed to permit crawfish to enter said cage of said main body, and
a sheet material positioned over said upwardly angled leading end bottom.

2. The crawfish harvest system of claim 1, wherein said crawfish traps comprise an openable trailing end, such that when said crawfish traps are hanging substantially vertically from said main line said crawfish can be removed from said crawfish trap by opening said trailing end.

3. The crawfish harvest system of claim 2, wherein said crawfish traps are attached to said main line by a hanger assembly which aligns said crawfish trap with a bottom of said crawfish pond, such that said crawfish trap is positioned upright on said bottom of said crawfish pond as said crawfish trap is deployed into and moved along said bottom of said crawfish pond, said hanger assembly also permitting said crawfish trap to hang vertically from said main line.

4. The crawfish harvest system of claim 3, wherein said hanger assembly comprises a thimble rotatably and slidably disposed on said main line, said thimble engageable with stops fixed to said main line at desired spacing, and wherein said hanger assembly further comprises a hanger extension which connects said crawfish trap to said thimble, whereby said bottom of said crawfish trap is substantially perpendicular to a longitudinal axis of said main line as said crawfish trap is deployed into said crawfish pond.

5. The crawfish harvest system of claim 1, wherein said crawfish trap deployment and retrieval unit comprises:
a powered pulley/roller system comprising a plurality of pulleys about which said main line runs, one or more of said pulleys being rotatably driven, whereby rotation of said one or more pulleys pulls said main line through said plurality of pulleys, thereby moving said one or more crawfish traps through said crawfish pond;
a crawfish sorter/bagger comprising an adjustable grate through which crawfish of a given size may fall; and
a hydraulic pump and hydraulic motor powering said one or more pulleys.

6. The crawfish harvest system of claim 5, wherein said powered pulley/roller system, said crawfish sorter/bagger, said hydraulic pump, said hydraulic motor and an internal combustion engine powering said hydraulic pump are mounted on a common carriage.

7. The crawfish harvest system of claim 5, wherein said powered pulley/roller system, said crawfish sorter/bagger and said hydraulic motor are positioned proximal said crawfish pond, and said hydraulic pump and an internal combustion engine are mounted on a movable carriage.

8. The crawfish harvest system of claim 1, wherein said one or more turn points comprise a rotatable pulley, said main line running around said rotatable pulley.

9. A crawfish trap, comprising:
a main body of a mesh material forming a cage, said main body comprising two opposed sides, a bottom, a leading end and a trailing end, said main body when viewed from a side comprising an angled, upturned bottom on said leading end; and
one or more funnels positioned in said main body, said funnels designed to permit crawfish to enter said cage of said main body, and
further comprising a sheet material positioned over said angled, upturned bottom on said leading end.

10. The crawfish trap of claim 9, wherein when viewed from a side said main body tapers down to a hinge mounted door at said trailing end.

11. A crawfish harvest system, comprising:
a crawfish trap deployment and retrieval unit positioned proximal a crawfish pond;
one or more crawfish traps attached to a main line, the main line engaged with said crawfish trap deployment and retrieval unit and running into said crawfish pond and around one or more turn points in said crawfish pond,
said one or more crawfish traps deployable into said crawfish pond and retrievable from said crawfish pond by said crawfish trap deployment and retrieval unit pulling said main line, wherein said one or more crawfish traps comprise a main body of a mesh material forming a cage, said main body comprising two opposed sides, a bottom, and a leading and trailing end, said main body when viewed from a side comprising an upwardly angled leading end bottom and a sheet material positioned over said upwardly angled leading end bottom, and tapering down at the trailing end to an openable door, such that when said crawfish traps are hanging substantially vertically from said main line said crawfish can be removed from said crawfish trap by opening said trailing end; and
one or more funnels in said main body, said funnels designed to permit crawfish to enter said cage of said main body;
said crawfish traps attached to said main line by a hanger assembly which aligns said crawfish trap with a bottom of said crawfish pond, such that said crawfish trap is positioned upright on said bottom of said crawfish pond as said crawfish trap is deployed into and moved along said bottom of said crawfish pond, said hanger assembly also permitting said crawfish trap to hang vertically from said main line, said hanger assembly comprising a thimble rotatably and slidably disposed on said main line, said thimble engageable with stops fixed to said main line at desired spacing, and wherein said hanger assembly further comprises a hanger extension which connects said crawfish trap to said thimble, whereby said bottom of said crawfish trap is substantially perpendicular to a longitudinal axis of said main line as said crawfish trap is deployed into said crawfish pond.

12. The crawfish harvest system of claim 11, wherein said crawfish trap deployment and retrieval unit comprises a powered pulley/roller system comprising a plurality of pulleys about which said main line runs, one or more of said pulleys being rotatably driven, whereby rotation of said one or more pulleys pulls said main line through said plurality of pulleys, thereby moving said one or more crawfish traps through said crawfish pond;

a crawfish sorter/bagger comprising an adjustable grate through which crawfish of a given size may fall; and     a hydraulic pump and hydraulic motor powering said one or more pulleys.

13. A method of harvesting crawfish, comprising the steps of:

a. providing a crawfish harvest system, comprising:

a crawfish trap deployment and retrieval unit positioned proximal a crawfish pond;

one or more crawfish traps attached to a main line, the main line engaged with said crawfish trap deployment and retrieval unit and running into said crawfish pond and around one or more turn points in said crawfish pond,         said one or more crawfish traps deployable into said crawfish pond and retrievable from said crawfish pond by said crawfish trap deployment and retrieval unit pulling said main line;

wherein said one or more crawfish traps comprise:

a main body of a mesh material forming a cage, said main body comprising two opposed sides, a bottom, and a leading and trailing end, said main body when viewed from a side comprising an upwardly angled leading end bottom;

one or more funnel-shaped entries into said main body, said funnel shaped entries designed to permit crawfish to enter said cage of said main body, and         a sheet material positioned over said upwardly angled leading end bottom;

b. deploying said one or more crawfish traps into said crawfish pond by pulling said main line with said crawfish trap deployment and retrieval unit and allowing said crawfish traps to remain in said pond for a desired length of time; and     c. retrieving said one or more crawfish traps from said pond by pulling said main line with said crawfish trap deployment and retrieval unit.

14. The method of claim 13, wherein said one or more crawfish traps are deployed into and retrieved from said crawfish pond without entry into said crawfish pond by personnel.

15. The method of claim 14, further comprising the steps of:

d. as said one or more crawfish traps return to said crawfish trap deployment and retrieval unit, permitting said one or more crawfish traps to hang substantially from said main line with a trailing end of said one or more crawfish traps positioned lowermost, with any crawfish therein falling toward said trailing end, and opening a door in said trailing end to permit said crawfish to fall from said one or more crawfish traps by gravity.

\* \* \* \* \*